(12) United States Patent
Marquardt et al.

(10) Patent No.: US 8,424,106 B2
(45) Date of Patent: Apr. 16, 2013

(54) SECURING A COMMUNICATION PROTOCOL AGAINST ATTACKS

(75) Inventors: David Richard Marquardt, Round Rock, TX (US); Prashant Anant Paranjape, Karnataka (IN); Poornima Srinivas Patil, Karnataka (IN)

(73) Assignee: International Business Machines Corporation, Armonk, NY (US)

(*) Notice: Subject to any disclaimer, the term of this patent is extended or adjusted under 35 U.S.C. 154(b) by 356 days.

(21) Appl. No.: 12/779,121

(22) Filed: May 13, 2010

(65) Prior Publication Data
US 2011/0283367 A1  Nov. 17, 2011

(51) Int. Cl.
*G06F 7/04* (2006.01)
*G06F 17/30* (2006.01)

(52) U.S. Cl.
USPC ........ 726/30; 726/23; 726/24; 726/4; 726/20; 713/160; 713/165; 709/229

(58) Field of Classification Search ............. 726/30, 726/23, 13; 713/161–165
See application file for complete search history.

(56) References Cited

U.S. PATENT DOCUMENTS

| | | | | |
|---|---|---|---|---|
| 6,662,213 | B1* | 12/2003 | Xie et al. | 709/206 |
| 6,917,974 | B1* | 7/2005 | Stytz et al. | 709/225 |
| 7,398,398 | B2* | 7/2008 | Ofek et al. | 713/180 |
| 7,590,855 | B2* | 9/2009 | Irwin | 713/181 |
| 7,773,546 | B2* | 8/2010 | Rajakarunanayake et al. | 370/278 |
| 7,950,059 | B2* | 5/2011 | Aharon et al. | 726/24 |
| 8,051,480 | B2* | 11/2011 | Mahaffey | 726/22 |
| 8,181,239 | B2* | 5/2012 | Pandya | 726/13 |
| 2003/0177391 | A1* | 9/2003 | Ofek et al. | 713/201 |
| 2003/0188001 | A1* | 10/2003 | Eisenberg et al. | 709/229 |
| 2004/0034773 | A1 | 2/2004 | Balabine et al. | |
| 2004/0064725 | A1* | 4/2004 | Padmanabhan et al. | 713/201 |
| 2004/0193876 | A1 | 9/2004 | Donley et al. | |
| 2005/0249225 | A1 | 11/2005 | Singhal | |
| 2006/0089994 | A1 | 4/2006 | Hayes | |
| 2007/0237144 | A1* | 10/2007 | Adhikari et al. | 370/392 |
| 2007/0300290 | A1* | 12/2007 | Shay et al. | 726/3 |
| 2008/0028474 | A1* | 1/2008 | Horne et al. | 726/27 |
| 2009/0089574 | A1* | 4/2009 | Pryor et al. | 713/150 |
| 2010/0050262 | A1* | 2/2010 | Knapp et al. | 726/25 |
| 2010/0251371 | A1* | 9/2010 | Brown | 726/23 |

OTHER PUBLICATIONS

Haining Wang, Detecting SYN flooding attacks, Jun. 23, 2002, IEEE, vol. 3, pp. 4-8.*

* cited by examiner

*Primary Examiner* — Nathan Flynn
*Assistant Examiner* — Viral Lakhia
(74) *Attorney, Agent, or Firm* — Garg Law Firm, PLLC; Rakesh Garg; Libby Z. Toub

(57) ABSTRACT

A method, system, and computer usable program product for securing a data communication against attacks are provided in the illustrative embodiments. A segment in the data communication is received at a first application executing in a first data processing system. The segment is formed according to a data communication protocol and includes an option. The option includes a current clue and a next clue. The current clue is compared with a saved next clue, the saved next clue being a next clue in a previous segment. The segment is accepted as being a valid segment in the data communication if the current clue matches the saved next clue. A part of the segment is sent to a consumer application.

20 Claims, 6 Drawing Sheets

SECURING A COMMUNICATION PROTOCOL AGAINST ATTACKS

BACKGROUND OF THE INVENTION

1. Field of the Invention

The present invention relates generally to an improved data processing system, and in particular, to a computer implemented method for operating securing data communications. Still more particularly, the present invention relates to a computer implemented method, system, and computer usable program code for securing a communication protocol against attacks.

2. Description of the Related Art

Data processing systems communicate with each other using a variety of data communication protocols. A communication protocol is essentially a set of rules that data processing systems must obey in establishing data communications using the protocol. Among other things, data communication protocols specify the structure in which the data should be exchanged, and syntax, semantics, and sequence of the communication building blocks to be used for such exchange.

A data communication protocol may also provide some aspect of data security. For example, a data communication protocol may make it difficult for an intruder to intercept the data being communicated using the protocol. The protocol may also make it difficult for the intruder to change or spoof the data in the communication.

For example, two data processing systems may be engaged in data communication using transmission control protocol/ Internet protocol (TCP/IP). Using a protocol, such as TCP/IP, often requires some identification of the source and destination addresses. For example, in TCP/IP, a source address (source IP address), a destination address (destination IP address), a source port, a destination port, and a protocol identifier is required to ensure that a data segment is communicated successfully over TCP/IP. A data segment is a unit of data communication formed according to a specification of the protocol.

An intrusion, interruption, or any type of undesirable interference with a protocol based data communication is called an attack on the protocol instance. A protocol instance is an instance of data communication using a protocol between a source and a destination data processing system. To attack a TCP/IP communication, an intruder can sniff and spoof the data segments being communicated. Sniffing a data segment is a process of detecting the particulars of a data segment or the protocol instance. Some types of attacks require the intruder to guess or detect at least the specific ports being used at each end of the data communication to attack the protocol instance.

A blind attack is a type of attack on a protocol based data communication infrastructure that does not require an intruder to sniff particular aspects of a data segment in order to attack a protocol instance. Often, a blind attack on a protocol instance, such as a TCP/IP instance, can be carried out by guessing the source and destination addresses and ports.

SUMMARY OF THE INVENTION

The illustrative embodiments provide a method, system, and computer usable program product for securing a communication protocol against attacks. An embodiment receives a segment in the data communication at a first application executing in a first data processing system. The segment is formed according to a data communication protocol and includes an option. The option includes a current clue and a next clue. The embodiment compares the current clue with a saved next clue, the saved next clue being a next clue in a previous segment. The embodiment accepts the segment as being a valid segment in the data communication if the current clue matches the saved next clue. The embodiment sends a part of the segment to a consumer application.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The invention recognizes that attacks on a protocol instance can cause disruption of data communications. In some cases, business critical data can be lost, corrupted, or can fall into malicious hands. Attacks on protocol instances can also decrease system performance, data network performance, or both.

The invention recognizes that the presently used methods for avoiding attacks on a protocol instance are ineffective under certain circumstances. For example, a client data processing system and a server data processing system may be communicating with each other over TCP/IP. A malicious user can guess the server Internet Protocol (IP) address, the client IP address and the server port, which is usually a well known port for certain communications. One security technique causes the client to randomly change the source port so that guessing the source port becomes more difficult for the malicious user.

The invention recognizes that such source port randomization technique suffers from certain drawbacks. For example, changing the ports can increase the chances of connection identifier (connection id) collision, which can lead to failure of connection establishment attempts. Changing ports can also make debugging and legitimate network investigation work more difficult and time consuming.

The invention further recognizes that randomizing the ports also increases the consumption of computing resources, such as processor cycles, degrading the system's performance. Furthermore, limited randomization or changing the ports in a predictable manner may fail as a security scheme entirely in a hostile environment.

As another example, some protocol instances employ encryption, signing, or other authentication of data segments. The invention recognizes that such measures are not without a performance hit on the system, as more computations are needed for processing the secured data segments.

Furthermore, some of these techniques may still not provide adequate security. For example, a signature being used by one system in its data communication with another system can be intercepted. Once known, the intercepted signature can be presented in a malicious data segment defeating the signature based security implementation.

The illustrative embodiments used to describe the invention generally address and solve the above-described problems and other problems related to protocol security. The illustrative embodiments provide a method, computer usable program product, and data processing system for securing a data communication protocol against attacks.

According to an embodiment of the invention, one data processing system may be able to continue communication with another system using the same address and port parameters with improved security of the protocol instance. An embodiment may further offer protection for the protocol instance even when a data segment is intercepted and the segment's contents are known by a malicious user.

An embodiment may not cause the overhead of decryption of authentication functions as in some present techniques. An embodiment may allow debugging and other legitimate network investigations to proceed in an efficient manner while maintaining the security of the protocol instance even when the malicious user has guessed or learned the parameters of the protocol instance.

The illustrative embodiments are described with respect to certain protocols, data, data structures, file systems, file names, directories, and paths only as examples. Such descriptions are not intended to be limiting on the invention. For example, an illustrative embodiment described with respect to TCP/IP may be implemented using another protocol within the scope of the invention. As another example, an illustrative embodiment described with respect to IP version 4 (IPv4) may be implemented using IP version 6 (IPv6).

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application may further include data objects, code objects, encapsulated instructions, application fragments, services, and other types of resources available in a data processing environment. For example, Java® object, an Enterprise Java Bean (EJB®), a servlet, or an applet may be manifestations of an application with respect to which the invention may be implemented. (Java, EJB, and other Java related terminologies are registered trademarks of Sun Microsystems, Inc. in the United States and other countries.)

An illustrative embodiment may be implemented in hardware, software, or a combination thereof. An illustrative embodiment may further be implemented with respect to any type of network communication resource, such as a physical or virtual network interface card, that may be available in a given partitioned data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, file systems, designs, architectures, layouts, schematics, and tools only as examples and are not limiting on the illustrative embodiments. Furthermore, the illustrative embodiments are described in some instances using particular software tools and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
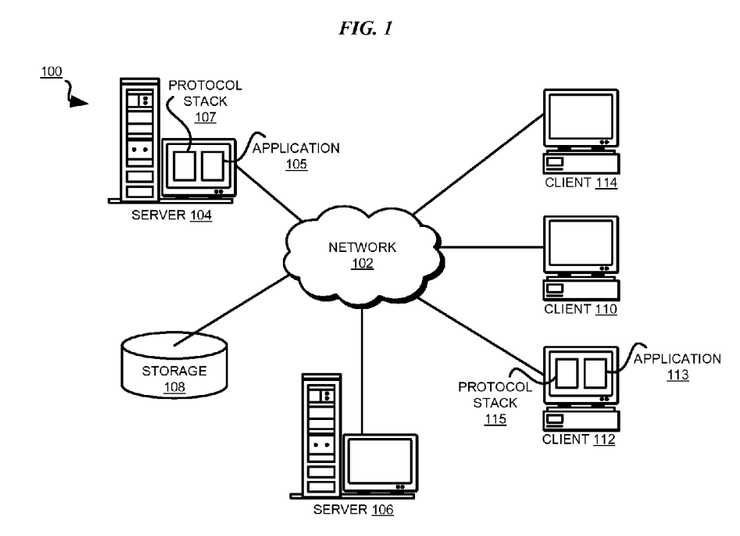
FIG. 1 depicts a pictorial representation of a network of data processing systems in which illustrative embodiments may be implemented.
Figure 2:
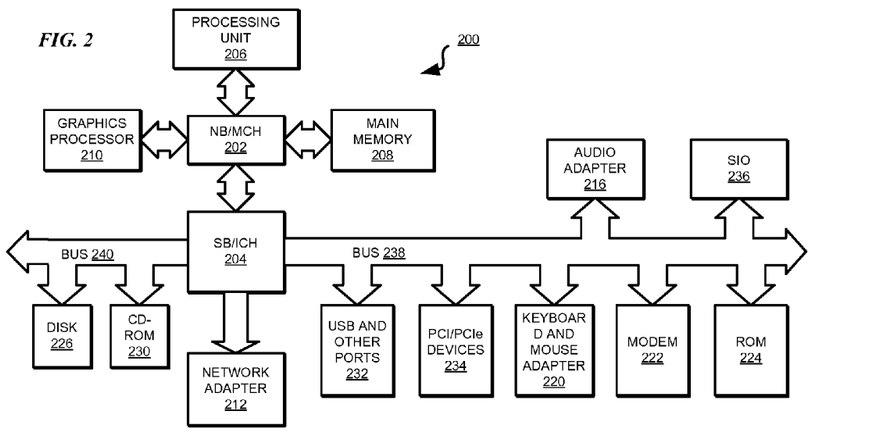
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include application 105 that communicates using a particular data communication protocol. Protocol stack 107 may be an application that facilitates data communication using that protocol for application 105 and other applications. Client 112 may include application 113 that may communicate with application 105 over the selected protocol. Client 112 may include protocol stack 115 to facilitate the communication over the selected protocol. Protocol stack 115 may be similar to protocol stack 107. For example, in one embodiment, protocol stacks 107 and 115 may each be a TCP/IP stack—software to enable communication over a TCP/IP network.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
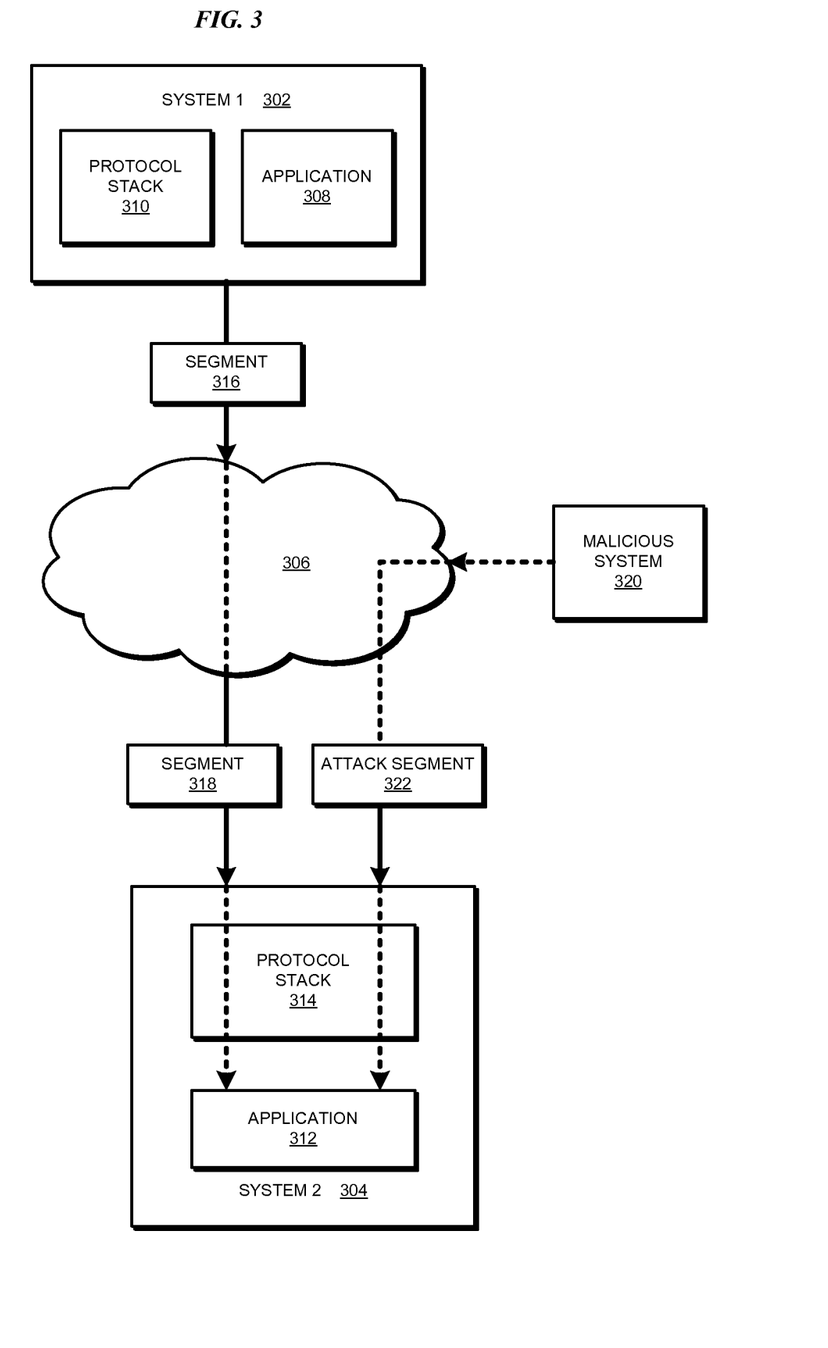
FIG. 3 depicts a block diagram of a data communication for the security of which an illustrative embodiment can be implemented.

With reference to FIG. 3, this figure depicts a block diagram of a data communication for the security of which an illustrative embodiment can be implemented. System 302, labeled "System 1" may be a data processing system, such as client 112 in FIG. 1. System 304, labeled "System 2" may be a data processing system, such as Server 104 in FIG. 1. For the clarity of the description only, system 302 will be treated as a client data processing system (client), and system 304 will be treated as a server data processing system (server), although the roles of systems 302 and 304 can be reversed or otherwise changed without limitation.

Systems 302 and 304 may be communicating over network 306, which may be similar to network 102 in FIG. 1. Furthermore, system 302 and 304 may communicate with each other using any protocol or a variant thereof of choice. For the clarity of the description only and without limitation on the invention, system 302 and system 304 may be assumed to use TCP/IP for such communication.

System 302 may include application 308 and protocol stack 310, similar to application 115 and protocol stack 117 in FIG. 1. System 304 may include application 312 and protocol stack 314, similar to application 105 and protocol stack 107 in FIG. 1.

Segment 316 may be a data segment sent from system 302 to system 304 over network 306. Segment 318 may be segment 316 as it reaches system 304. Protocol stack 314 may determine that segment 318 is a valid segment from application 308 to application 312. Protocol stack 314 may transmit segment 318 or some content thereof to application 312.

Malicious system 320 may be an application or system that may be attempting to either gain control of the communication between systems 302 and 304, or otherwise attack the protocol instance between systems 302 and 304. For example, malicious system 320 may be attempting to disrupt the services being provided by system 304.

Malicious system 320 may transmit segment 322 to system 304 to cause such an attack. In one embodiment, the attack using segment 322 may be a blind attack on the TCP/IP instance of systems 302 and 304.

Under certain circumstances, the attack by malicious system 320 using segment 322 may succeed. In other words, protocol stack 314 may receive segment 322 and determine that segment 322 is a legitimate segment destined for application 312. For example, protocol stack 314 may regard a suitably formed segment 322 as originating from application 308 and destined for application 312.

Protocol stack 314 may transmit segment 322 or some content thereof to application 312. Receiving segment 322 or some part thereof at application 312 may cause undesirable consequences, such as corruption of data or shutdown of application 312.

Figure 4:
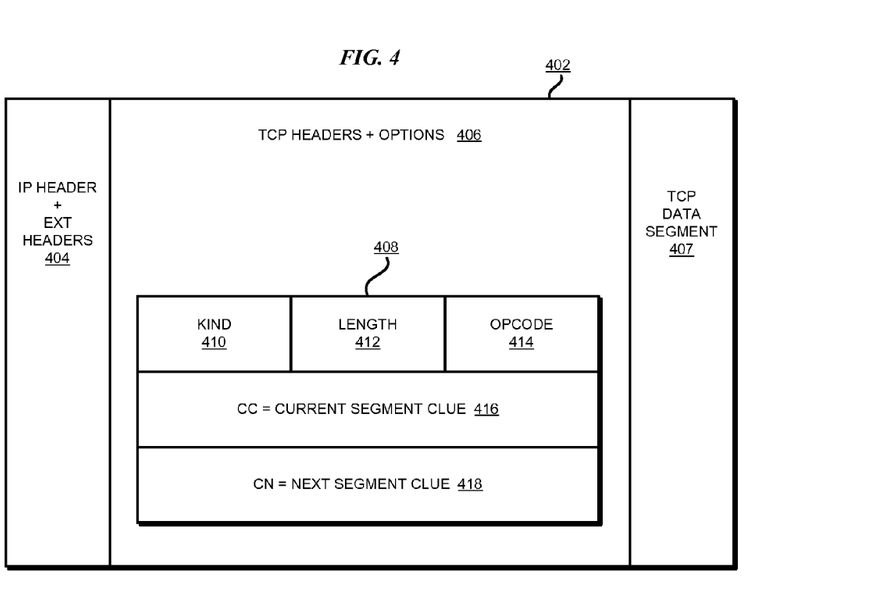
FIG. 4 depicts a block diagram of an example segment constructed for securing a communication protocol against attacks in accordance with an illustrative embodiment.

With reference to FIG. 4, this figure depicts a block diagram of an example segment constructed for securing a communication protocol against attacks in accordance with an illustrative embodiment. Segment 402 may be a data segment, such as segment 316 in FIG. 3. Only as an example for the clarity of the description, and without limitation on the invention, segment 402 is constructed as a TCP/IP segment.

Segment 402 includes headers 404, which may include IP headers and certain other headers. Header 406 may include a TCP header and a set of options. Segment 402 may further include data segment 407, which may carry the data payload of segment 402.

An option is a data structure designed to communicate certain optional information. A set of options is one or more options. An option may be present in different locations in different protocols and versions of protocols. For example, in TCP, options can exist in TCP headers. Protocol option header normally follows the protocol main header. An option may be located in any header, place, or position in segment 402 without limitation. Different options may be located in different places within a segment.

Option 408 is constructed according to a TCP/IP specification as an example. Other structures for achieving similar purpose will be apparent from this disclosure to those of ordinary skill in the art and those structures are contemplated within the scope of the invention.

For example, option 408 may include kind code 410, which identifies the type of option information being carried in option 408. In one embodiment, the kind code may be a code that is not reserved for another purpose in the protocol's specification. In another embodiment, the kind code may be a kind code reserved for a specific purpose but is repurposed for use according to an illustrative embodiment by mutual agreement of the communicating data processing systems. Length 412 may be the data length occupied by option 408. For example, length 412 may be the number of octets in option 408.

Opcode 414 may be a code. In one embodiment, opcode 414 may indicate how certain information in option 408 should be used. In another embodiment, opcode 414 may indicate what certain information in option 402 represents. In another embodiment, opcode may indicate any combination of these and other information about certain information in option 402.

In one embodiment, opcode 414 may be accommodated in a single bit, such as to indicate one or two alternatives. In another embodiment, opcode 414 may be several bits long, such as to indicate one of several alternatives, or to indicate a set of flags.

Clue 416, labeled "CC", may be a current segment clue, or simply, a current clue. Clue 418, labeled "CN", may be a next segment clue, or simply, a next clue.

A clue is a bit pattern of any length. For example, in one embodiment, a clue may be a binary representation of a random number. In another embodiment, a clue may be a binary representation of a predetermined code. In another embodiment, a clue may be any alphanumeric or symbolic text of any length converted to a fixed number of binary bits. For example, a 32-bit clue can be constructed by suitably hashing or converting a 100-character long string of mixed alphanumeric characters and a symbol set.

In one embodiment, a clue may be constructed from an unlimited number of possibilities, such as from random numbers without an upper bound. In another embodiment, a clue may be constructed or computed from a fixed set of numbers, text, or symbols. In another embodiment, a clue may be selected from a fixed set of binary representations.

In segment 402, current clue 416 is associated with segment 402 and next clue 418 is associated with a segment that will follow segment 402 in the data communication. In other words, current clue 416 is the next clue from the segment immediately previous to segment 402 and the next clue is the current clue for the segment immediately after segment 402 in a given communication. Current clue 416 and next clue 418 identify a chain of segments in this manner.

Current clue 416 acts as an identifier of segment 402. Normally, the segment before segment 402 will have provided the receiver of segment 402, such as protocol stack 314 in FIG. 3, current clue 416 in the form of the next clue. Segment 402 provides the receiver of segment 402 the identifier to expect in the next segment, viz, next clue 418, in advance. The receiver, upon receipt of the next segment compares the current clue in that next segment with the next clue from segment 402.

Except for certain exceptions, each segment can provide non-repeating current and next clues. Thus, each segment is secured by a changed clue which is communicated to a receiver in advance of the segment. The receiver need not perform encryption, authentication, or other types of computations, but merely save the next clue from each segment and compare the saved clue with the current clue of the next segment to determine the validity of each next segment.

Operating in this manner, if segment 402 contains current clue 416 that matches the next clue from the previous segment, the receiver accepts segment 402. If current segment 402 is attack segment 322 in FIG. 3, the attack segment is unlikely to have the correct current clue 416 and the receiver will reject segment 402 and the attack will fail in the very first attack segment.

Even if the attack segment somehow discovers the correct current clue 416, the attack segment is unlikely to have the correct next clue to match the current clue of the next legitimate segment. The receiver will therefore reject the next segment and the attack will fail in two attack segments.

Even if after the timely and computationally impossible odds of guessing both—current clue 416 and next clue 418—correctly, the malicious system is unlikely to be able to continue to guess the changing current and next clues on a per segment basis and the attack will fail in the third attack segment.

Figure 5:
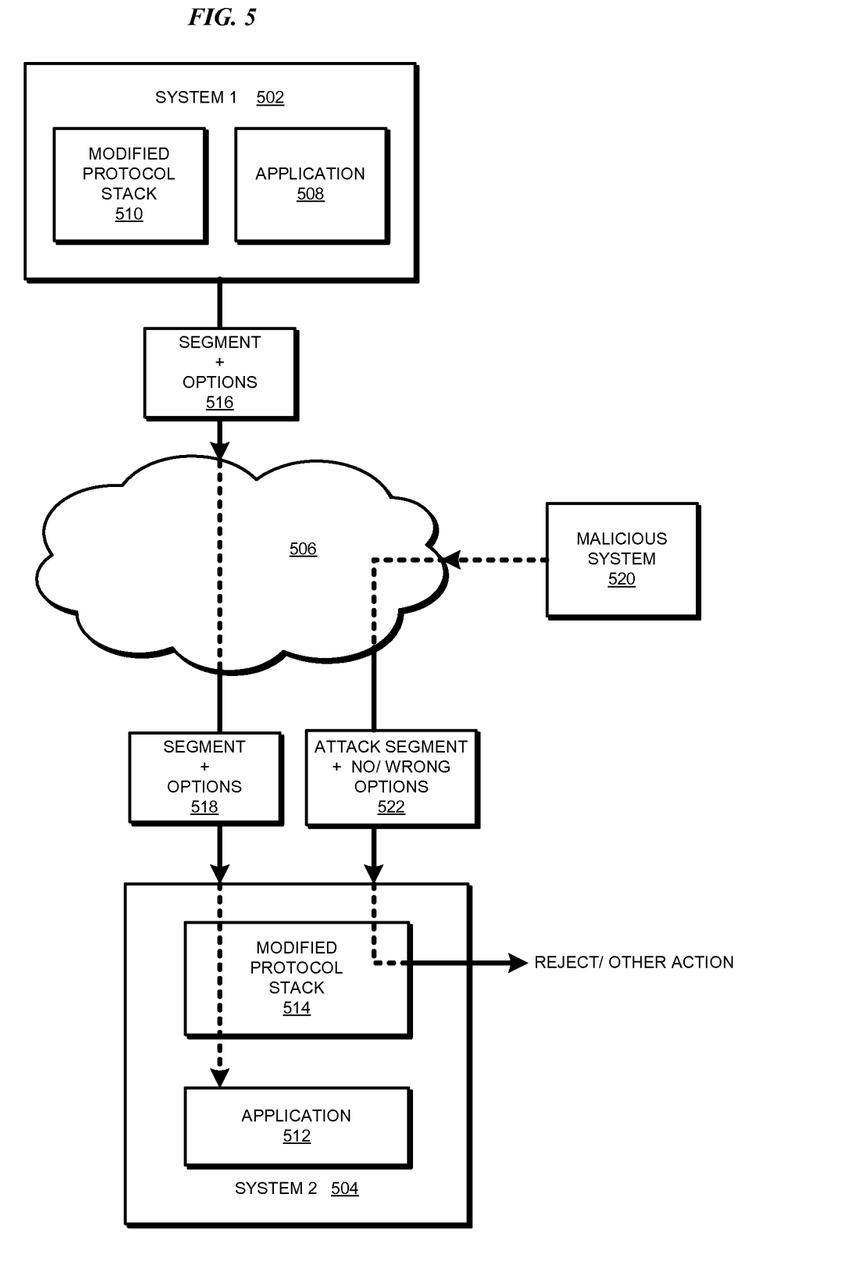
FIG. 5 depicts a block diagram of an example operation for securing a communication protocol against attacks in accordance with an illustrative embodiment.

With reference to FIG. 5, this figure depicts a block diagram of an example operation for securing a communication protocol against attacks in accordance with an illustrative embodiment. Systems 502 and 504, network 506, applications 508 and 512, and malicious system 520 may be similar to the corresponding depictions in FIG. 3.

System 502 may include modified protocol stack 510. Modified protocol stack 510 may be configured to populate one or more options in a segment with current and next clues. For example, in one embodiment, the current clue and the next clue may be provided in two separate options. Modified protocol stack 510 may also be configured to compare the current clue being presented in a segment with a saved next clue from a previous segment.

Some example exceptional conditions are described elsewhere in this disclosure. Modified protocol stack 510 may further include functionality to handle certain exceptions or exceptional conditions encountered in data communications over a protocol.

Modified protocol stack 510 may further be configured to reject or take other actions with respect to segments with incorrect clues. For example, modified protocol stack 510 may record a tracing of the route of an attack segment in a log file instead of or in addition to rejecting the attack segment. Modified protocol stack 514 may be similar to modified protocol stack 510.

Using modified protocol stack 510, application 508 may transmit segment 516. Segment 516 includes one or more options including current and next clues values. Segment 516 may appear as segment 518 at modified protocol stack 514. Modified protocol stack 514 may determine that segment 518 is a valid segment based on the current clue in segment 518. Modified protocol stack 514 may transmit all or part of segment 518 to application 512.

Malicious system 520 may transmit attack segment 522 to system 504. Malicious system 520 may not be equipped to attack protocol instances implementing an embodiment. Accordingly, attack segment 522 may not include any current clue at all. Modified protocol stack 514 may reject and/or take certain actions, such as notify an application, when segments are received without a current clue value.

Where malicious system 520 is attempting to attack a protocol instance implementing an illustrative embodiment, computationally, it may be extreme unlikely to compute the correct current clue in a timely manner to populate attack segment 522 such that attack segment 522 can pose as segment 518 at approximately the same time or before segment 518 arrives at system 504. Given that attack segment 522 is unlikely to include a valid current clue, modified protocol stack 514 rejects, takes other action, or both, with attack segment 522.

Even if malicious system 520 is able to timely guess a current clue, a next clue, or both, the guess is very unlikely, almost impossible, to yield continuing series of current and next clues. The attack is likely to fail in just a few segments as described earlier. Thus, an embodiment secures the communication protocol used by systems 502 and 504 against attacks.

Figure 6:
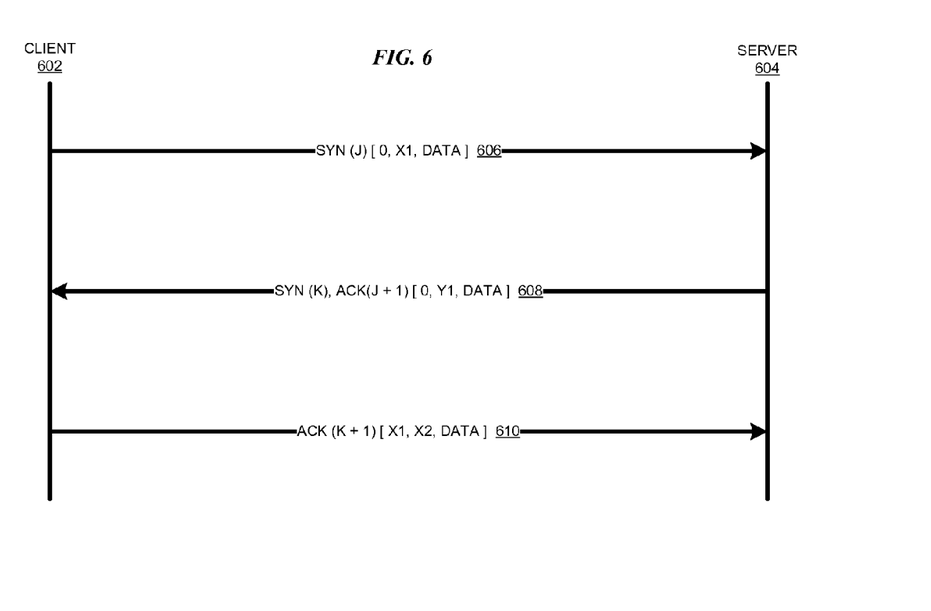
FIG. 6 depicts a timing diagram of an initial handshake segment exchange where the communication is secured against attacks in accordance with an illustrative embodiment.

Certain exceptional conditions arise in a data communication using a protocol. For example, when segment 402 in FIG. 4 is the first segment being sent to a receiver, the receiver does not have a saved clue to compare with current clue 416 in FIG. 4 to determine the validity of segment 402. FIG. 6 describes an example way of handling this scenario according to an illustrative embodiment.

With reference to FIG. 6, this figure depicts a timing diagram of an initial handshake segment exchange where the communication is secured against attacks in accordance with an illustrative embodiment. Client 602 may be system 502 in FIG. 5. Server 604 may be system 504 in FIG. 5. The conventions of a three-way handshake in TCP/IP communications are used here only as examples to illustrate the operation depicted in this figure.

Client 602 sends synchronization segment, or "SYN" segment 606, to server 604. SYN segment 606 includes initial segment number "J" from which the segment numbers increment at each segment sent to or from client 602.

SYN segment 606 being the first segment, server 604 may not have a saved next clue with which to compare a current clue in SYN segment 606. Accordingly, SYN segment 606 provides a current clue that is set to a predetermined value, for example, "0". Any predetermined initial current clue value can be used instead of 0 in SYN segment 606.

SYN segment 606 further provides a next clue value represented by "X1". In other words, client 602 informs server 604 that the next segment server 604 receives from client 602 will have the current clue set to X1. X1 may be any bit pattern, for example, 32 bits forming the "11101000001010101010111010010111" pattern. Data payload represented by "DATA" may be included in SYN segment 606, if permitted by the protocol being used.

Server 604 receives SYN segment 606. SYN segment 606 being the first segment, as identified by the predetermined initial current clue in SYN segment 606, server 604 need not match the predetermined initial current clue with any saved next clues.

Server 604 responds with a segment that may be a combination of a synchronization (SYN) segment and an acknowledgement (ACK) segment. ACK segment in segment 608 increments the J counter to J+1.

SYN segment in Segment 608 includes initial segment number "K" from which the segment numbers increment at each segment sent to or from server 604. SYN segment of segment 608 being the first segment from server 604, client 602 may not have a saved next clue with which to compare a current clue in SYN segment of segment 608. Accordingly, SYN segment of segment 608 provides a current clue that is set to a predetermined value, for example, "0". Any predetermined initial current clue value can be used instead of 0 in SYN segment of segment 608.

SYN segment of segment 608 further provides a next clue value represented by "Y1". In other words, server 604 informs client 602 that the next segment client 602 receives from server 604 will have the current clue set to Y1. Y1 may be any bit pattern, for example, 64 bits forming the "0101010111010010111010000010101010101110100101110101010111010010" pattern. Data payload represented by "DATA" may be included in SYN segment of segment 608, if permitted by the protocol being used.

Responding to SYN segment in segment 608, client 602 sends ACK segment 610 to server 604. ACK segment 610 increments the K counter to K+1. ACK segment 610 utilizes the next clue X1 from segment 606 as the current clue in ACK segment 610. ACK segment 610 provides X2 as the next clue. Any data, represented by "DATA" may be the payload of ACK segment 610 if permitted by the protocol being used.

Data communication following this three-way handshake progresses as described above. Current clues and next clues progress and change in the manner described above in subsequent segments exchanged between client 602 and server 604.

Notice that client 602 and server 604 may use different types, lengths, and forms of next clues X1 and X2, and Y1 and Y2, and subsequent next clues. X1, X2, Y1, Y2, and subsequent next clues Xn, Yn, may be generated in any manner suitable at client 602 and server 604. The generation methods may be different in client 602 and server 604.

Opcode value may be used, for example, to indicate a chained segment. For example, in the three-way handshake and the segments that follow, opcode may be set to a designated value, such as "0", to indicate that the segments being exchanged are chained in the communication.

FIG. 6 depicts only one exceptional condition in data communications over a protocol, to wit, the initial segments. Many other exceptional conditions may arise during such data communications. Following are a few more examples of possible exceptional conditions. This list of example exceptional conditions is not exhaustive and is not intended to be limiting on the invention. Those of ordinary skill in the art will be able to conceive additional or different conditions that can be handled using an embodiment in a similar manner. Such conditions are contemplated within the scope of the invention.

For example, under certain circumstances, a wildcard clue may be used as a current clue. A wildcard clue is a clue value that is always considered to be valid regardless of any saved next clues.

A client-server pair may pre-designate a wildcard clue value, or may establish one during a data communication session. For example, instead of a "0" as an initial current clue in SYN segments, a client may provide what the client will regard as a valid wildcard clue if presented in a segment from the server. For example, bit pattern "1010101010101010" may be a wildcard clue acceptable to the client. Similarly, instead of a "0" as an initial current clue in SYN segments, a server may provide what the server will regard as a valid wildcard clue if presented in a segment from the client. For example, bit pattern "00110011" may be a wildcard clue acceptable to the server.

Wildcard clues may be useful in keep-alive segments. A keep-alive segment is not a segment in the chain or substance of the data communication but is transmitted to keep a data communication session alive between two systems.

A different opcode value, for example, "1", may be used to indicate that a wildcard clue is being used. Normally, several consecutive segments using the wildcard clue as the current clue should not be allowed. Allowing such consecutive segments may allow a malicious system to send several attack segments populated with wildcard clues and defeat the security measure provided by the illustrative embodiments.

As another example of an exceptional condition, a next clue may not be required if a segment is the last segment in a data communication, or a lone segment forming the entire data communication. Certain ACK segments operate as the entire communication. In such cases, for example, the next clue may be set to a predetermined value, such as "0".

As another example of an exceptional condition, a connection, such as a TCP/IP connection, between a client and a server may be reset. A connection can be reset for a variety of reasons, not always initiating from the client or the server. Under such circumstances, an active close of session can be performed by sending a segment with next clue set to a predetermined value, for example, "0", indicating that there will be no more segments from the sender. Either the client or the server may send such a segment and perform the active close in this manner.

As another example of an exceptional condition, packets or segments may be lost or delayed in transmission. Under certain circumstances, a lost segment may be re-transmitted with the clues that were used in the lost segment. Under certain other circumstances, wildcard clues may be used to resynchronize the transmission. Under certain other circumstances, standalone acknowledgements, different opcode values, other techniques described in this disclosure, or some variation thereof, may be used to overcome the lost segment condition.

For example, assume that a small segment "S" has to be sent either because the segment does not have a data payload, because the sending has been delayed for a suitable time, or because the segment is being sent due to a TCP_NODELAY flag being set. Further assume that this small segment is lost. A second segment "T" is sent after segment "S". At some point in time the communicating systems determine that segment "S" is lost and that the selective acknowledgments are out of sync. The sending system resends beginning at the beginning of "S", including segment "S" and all or part of segment "T".

In accordance with an embodiment, the clues may operate as follows in a "re-packetization" method of handling the lost segments. Once the client identifies that S is finally lost from server acknowledgments and expected ACK for the sent segments, the client may retransmit (starting with S) entire S and part or full T segment. In this case, the client can use the old CC, CNN clues in segment S while re-packetizing data. The client may generate new clues for subsequent packets as the entire process of retransmission is started from S all over again. The segments, and the clues, sent after segment S are meaningless with selective_ack set to "off" and when re-packetization is implemented.

In accordance with another embodiment, the clues may operate as follows in a "no re-packetization" method of handling the lost segments. In this case, the client simply resends the existing segments S and T from the client's sender window with exactly the same data and clues as originally transmitted.

In accordance with another embodiment, the clues may operate as follows in a "selective_ack ON" method of handling the lost segments. In this case, the ACKs contain left and right side sequence numbers of missing data at the receiver. According to an embodiment, the sender may use the wildcard clue for this case because only a limited number of missing segments have to be re-transmitted, with or without re-packetization. The wildcard clues help retransmit such segments without requiring CC of a current segment to match with CN of a previous segment because identifying correct previous segment in case of lost segments is otherwise difficult.

In accordance with another embodiment, the clues may operate as follows in a "loss of ACK segment only" scenario when no data segment is lost. In this case, an embodiment may allow sending the ACK only segment using the wildcard clues and the sender may not even know about the loss of the ACK only segment.

These examples of exceptional conditions are not intended to be limiting on the invention. Many other exceptional conditions can be handled by using a combination of the techniques described in this disclosure or some variation thereof.

In a multi-bit opcode, a different opcode value may indicate certain exceptional conditions including the exceptional condition described in some of these examples. Using opcodes to indicate certain conditions pertaining to the segments and the clues therein may expedite the processing of the segments according to an embodiment.

Figure 7:
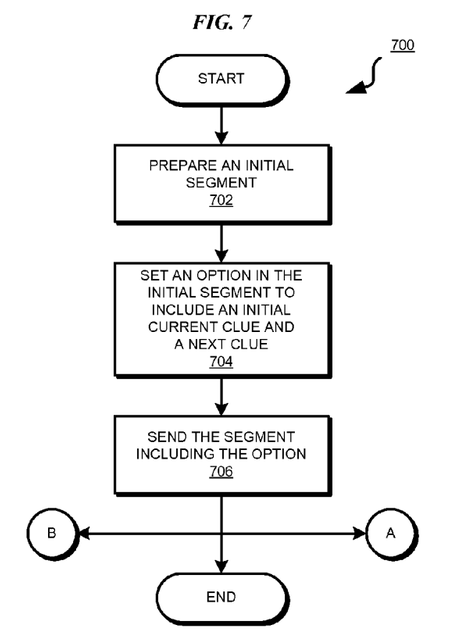
FIG. 7 depicts a flowchart of a process of initiating a data communication using the security method in accordance with an illustrative embodiment.

With reference to FIG. 7, this figure depicts a flowchart of a process of initiating a data communication using the security method in accordance with an illustrative embodiment. Process 700 may be implemented in an application, such as modified protocol stack 510 or 514 in FIG. 5.

Process 700 begins by preparing an initial segment (step 702). Process 700 sets an option in the initial segment to include an initial current clue and a next clue (step 704). Process 700 sends the segment including the option to a receiver (step 706).

Process 700 may end thereafter, such as when no further segments are to be transmitted. Alternatively, process 700 may exit at exit point marked "A" and enter another process with a corresponding entry point marked "A". Alternatively, process 700 may exit at exit point marked "B" and enter another process with a corresponding entry point marked "B".

Figure 8:
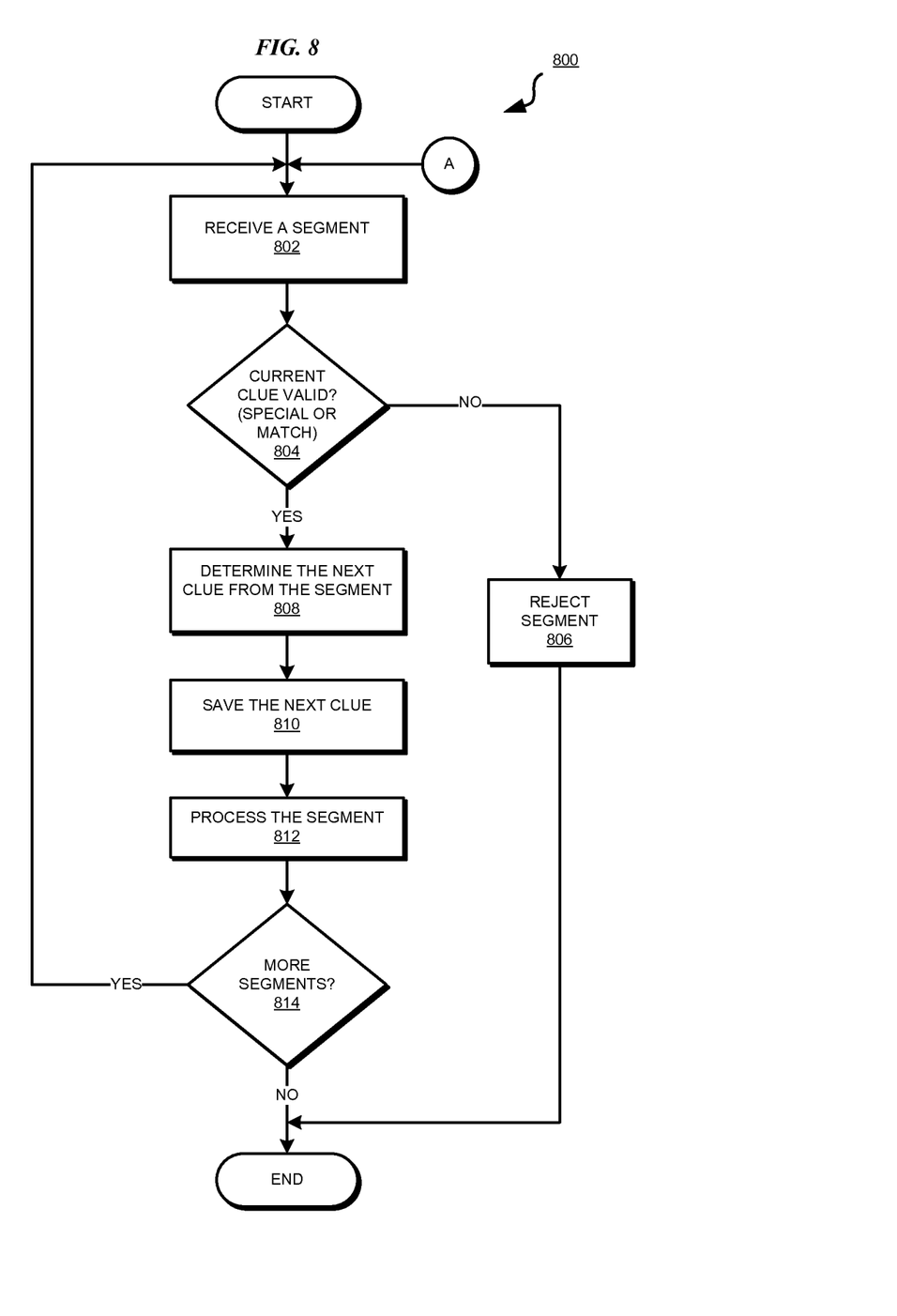
FIG. 8 depicts a process of initiating and maintaining a data communication using the security method in accordance with an illustrative embodiment.

With reference to FIG. 8, this figure depicts a process of initiating and maintaining a data communication using the security method in accordance with an illustrative embodiment. Process 800 may be implemented in an application, such as modified protocol stack 510 or 514 in FIG. 5.

Process 800 begins by receiving a segment (step 802). Another process according to this disclosure may enter at entry point "A" and begin by executing step 802.

Process 800 determines whether the current clue is valid (step 804). For example, process 800 may determine whether the current clue is a special clue, such as a wildcard clue, a predetermined initial clue, another predetermined clue, or a previously sent next clue.

If process 800 determines that the current clue is invalid ("No" path of step 804), process 800 rejects the segment (step 806). Process 800 may take additional steps (not shown), such as notifying an application, reconfiguring a networking device, or updating a log.

If the current clue is valid ("Yes" path of step 804), process 800 determines the next clue from the segment (step 808). Process 800 saves the next clue (step 810). Process 800 processes the segment (step 812).

Process 800 determines whether more segments are to be expected (step 814). If no more segments are expected ("No" path of step 814), such as when the segment is the last segment or the next clue is a predetermined value, process 800 ends. If more segments are expected ("Yes" Path of step 814), process 800 returns to step 802.

Figure 9:
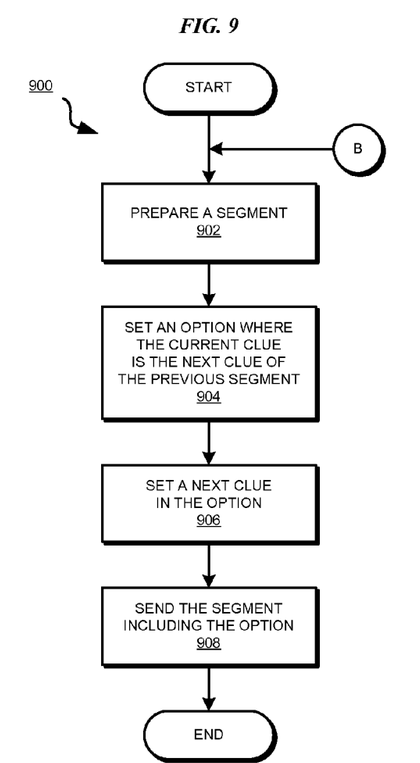
FIG. 9 depicts a flowchart of a process of maintaining communication by chaining segments in accordance with an illustrative embodiment.

With reference to FIG. 9, this figure depicts a flowchart of a process of maintaining communication by chaining segments in accordance with an illustrative embodiment. Process 900 may be implemented in an application, such as modified protocol stack 510 or 514 in FIG. 5.

Process 900 begins by preparing a segment, such as by collecting all the information necessary to form the segment (step 902). Process 900 sets an option in the segment where the current clue is the next clue of the previous segment that process 900 prepared (step 904). Process 900 sets the next clue to another value in the segment (step 906). Process 900 sends the segment including the option to a receiver (step 908). Process 900 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for securing a data communication protocol against attacks. Using the embodiments of the invention, a data communication over a selected protocol may be impervious to attacks.

An embodiment may initiate and maintain data communication by chaining segments of the data communication using current and next clues. An embodiment may employ special clues, such as wildcard clues or predetermined clues to address certain exceptional situations during the data communication.

The embodiments are generally described with the intention to conform to existing protocol specifications. Any feature contrary to an existing protocol specification is described in that manner only to illustrate possible alternatives and implementation choices, or for accommodating aspects of some protocols that may be contradictory with similar aspects of other protocols.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for securing a data communication against attack, the computer implemented method comprising:
    receiving at a first application executing in a first data processing system, a segment in the data communication, the segment being formed according to a data communication protocol and including an option, the option including a current clue and a next clue;
    comparing the current clue with a saved next clue, the saved next clue being a next clue received at the first application executing in the first data processing system in a previous segment;
    accepting, responsive to the current clue matching the saved next clue, the segment as being a valid segment in the data communication; and
    sending a part of the segment to a consumer application.

2. The computer implemented method of claim 1, further comprising:
    receiving at the first application an initial segment, the initial segment including a predetermined current clue and an initial next clue;
    saving the initial next clue; and
    accepting the initial segment as a valid segment.

3. The computer implemented method of claim 1, further comprising:
    preparing the segment at a second application executing in a second data processing system.

4. The computer implemented method of claim 1, the current clue and the next clue are placed in separate options, and an option including a clue uses a kind code not reserved for another use in the protocol of the data communication.

5. The computer implemented method of claim 1, wherein the previous segment is a segment that is received immediately prior to the segment, the segment and the previous segment being sent from a common second application.

6. The computer implemented method of claim 1, wherein the current clue is a wildcard clue, the wildcard clue being valid even if the wildcard clue does not match the saved next clue.

7. The computer implemented method of claim 6, further comprising:
    rejecting the segment if the previous segment also used the wildcard clue in place of the current clue.

8. The computer implemented method of claim 1, further comprising:
    configuring at a second application, the option in the segment for an exceptional condition, the configuring including setting one of the current clue and the next clue to a predetermined value.

9. The computer implemented method of claim 8, further comprising:
    setting an opcode value in the option to a predetermined value to indicate the exceptional condition.

10. The computer implemented method of claim 8, wherein the exceptional condition is a transmission of a keep-alive segment in the data communication.

11. A computer usable program product comprising a computer usable storage device including computer usable code for securing a data communication against attack, the computer usable code comprising:
    computer usable code for receiving at a first application executing in a first data processing system, a segment in the data communication, the segment being formed according to a data communication protocol and including an option, the option including a current clue and a next clue;
    computer usable code for comparing the current clue with a saved next clue, the saved next clue being a next clue received in a previous segment;
    computer usable code for accepting, responsive to the current clue matching the saved next clue, the segment as being a valid segment in the data communication; and
    computer usable code for sending a part of the segment to a consumer application.

12. The computer usable program product of claim 11, further comprising:
    computer usable code for receiving at the first application an initial segment, the initial segment including a predetermined current clue and an initial next clue;
    computer usable code for saving the initial next clue; and
    computer usable code for accepting the initial segment as a valid segment.

13. The computer usable program product of claim 11, further comprising:
   computer usable code for preparing the segment at a second application executing in a second data processing system.

14. The computer usable program product of claim 11, the current clue and the next clue are placed in separate options, and an option including a clue uses a kind code not reserved for another use in the protocol of the data communication.

15. The computer usable program product of claim 11, wherein the current clue is a wildcard clue, the wildcard clue being valid even if the wildcard clue does not match the saved next clue.

16. The computer usable program product of claim 15, further comprising:
   computer usable code for rejecting the segment if the previous segment also used the wildcard clue in place of the current clue.

17. The computer usable program product of claim 11, further comprising:
   computer usable code for configuring at a second application, the option in the segment for an exceptional condition, the configuring including setting one of the current clue and the next clue to a predetermined value.

18. The computer usable program product of claim 11, wherein the computer usable code is stored in a computer readable storage medium in a data processing system, and wherein the computer usable code is transferred over a network from a remote data processing system.

19. The computer usable program product of claim 11, wherein the computer usable code is stored in a computer readable storage medium in a server data processing system, and wherein the computer usable code is downloaded over a network to a remote data processing system for use in a computer readable storage medium associated with the remote data processing system.

20. A data processing system for securing a data communication against attack, the data processing system comprising:
   a storage device including a storage medium, wherein the storage device stores computer usable program code; and
   a processor, wherein the processor executes the computer usable program code, and wherein the computer usable program code comprises:
      computer usable code for receiving at a first application executing in a first data processing system, a segment in the data communication, the segment being formed according to a data communication protocol and including an option, the option including a current clue and a next clue;
      computer usable code for comparing the current clue with a saved next clue, the saved next clue being a next clue received in a previous segment;
      computer usable code for accepting, responsive to the current clue matching the saved next clue, the segment as being a valid segment in the data communication; and
      computer usable code for sending a part of the segment to a consumer application.

* * * * *